Dec. 13, 1955   R. S. HUMMEL   2,726,835
COLLAPSIBLE DISPLAY STANDS
Filed Feb. 6, 1951   7 Sheets-Sheet 2
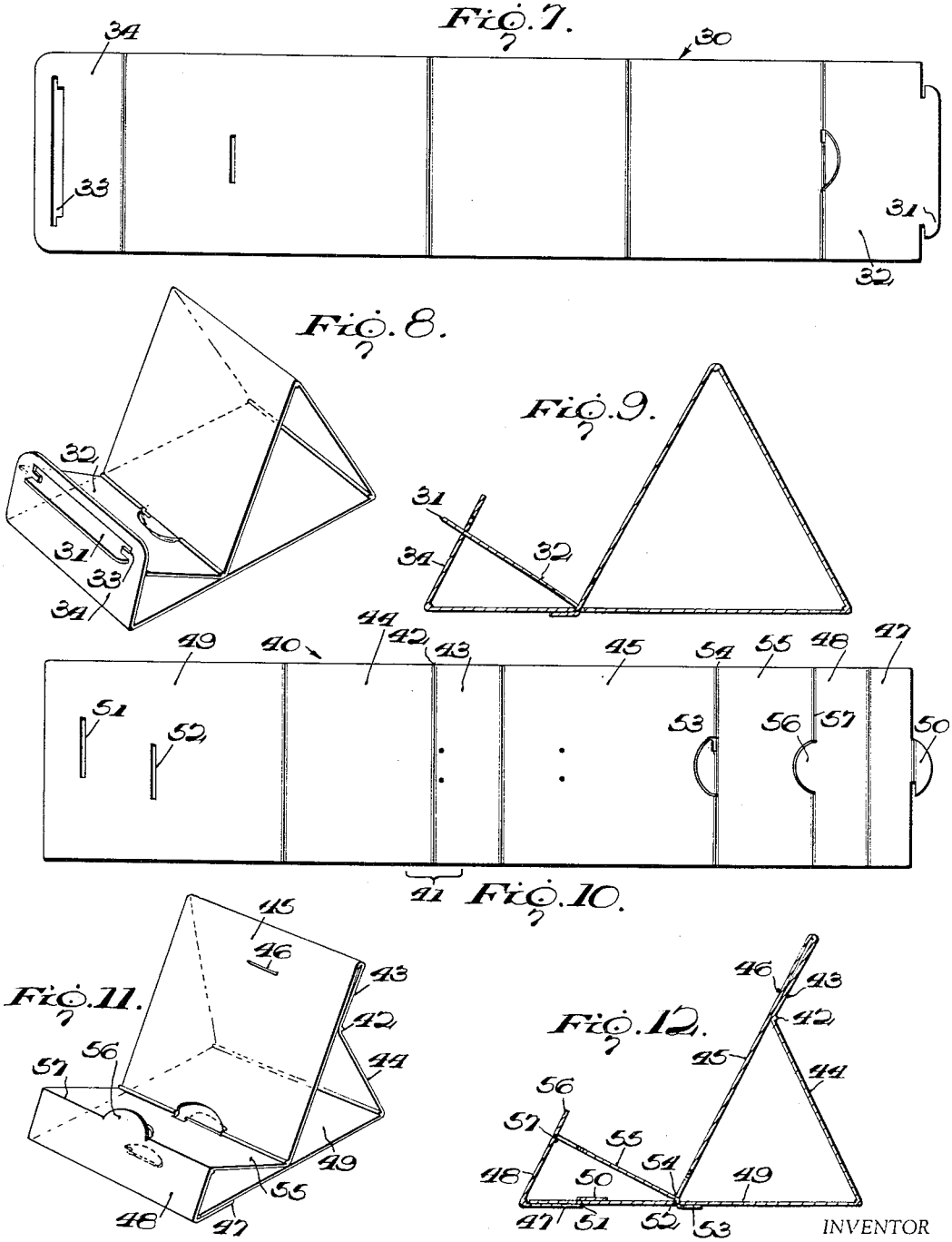
INVENTOR
Robert Stuart Hummel
BY Albert H. Kirchner
ATTORNEY Dec. 13, 1955 R. S. HUMMEL 2,726,835
COLLAPSIBLE DISPLAY STANDS
Filed Feb. 6, 1951 7 Sheets-Sheet 3
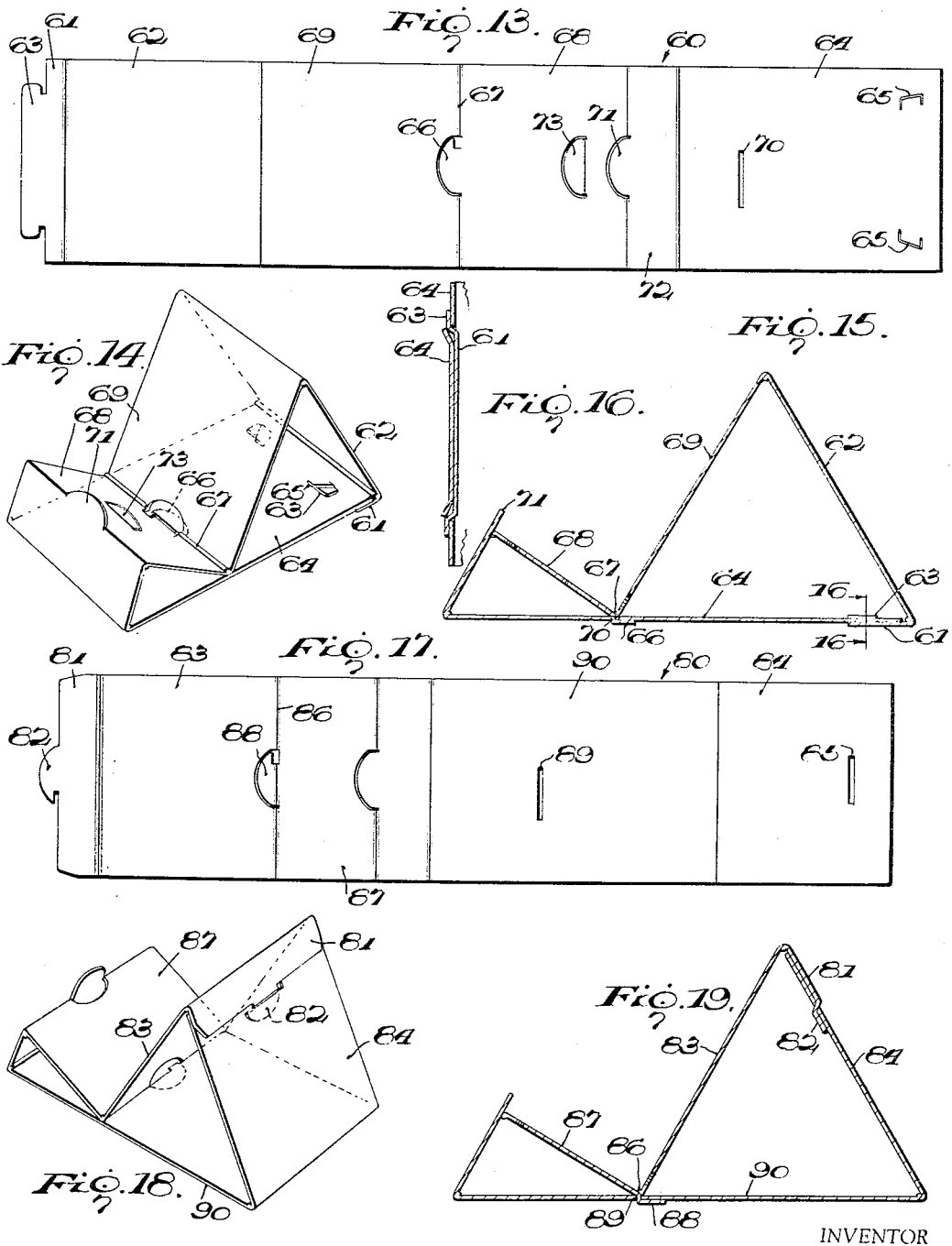
INVENTOR
Robert Stuart Hummel
BY Albert H. Kirchner
ATTORNEY Dec. 13, 1955  R. S. HUMMEL  2,726,835
COLLAPSIBLE DISPLAY STANDS
Filed Feb. 6, 1951  7 Sheets-Sheet 4
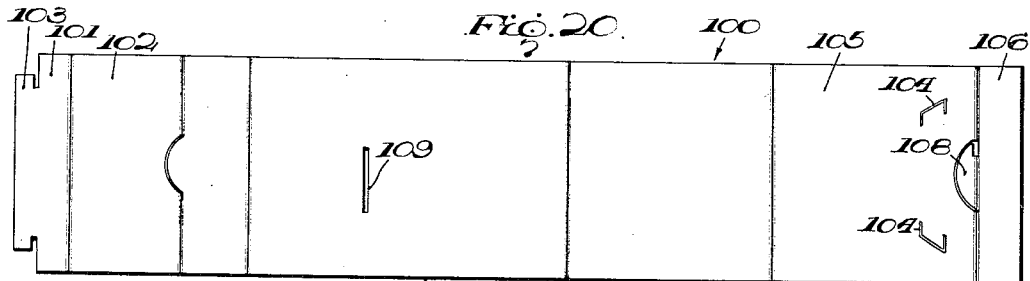
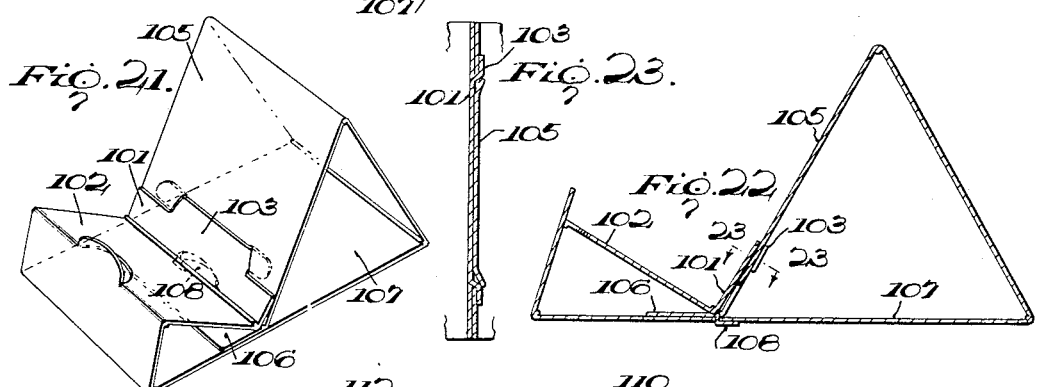
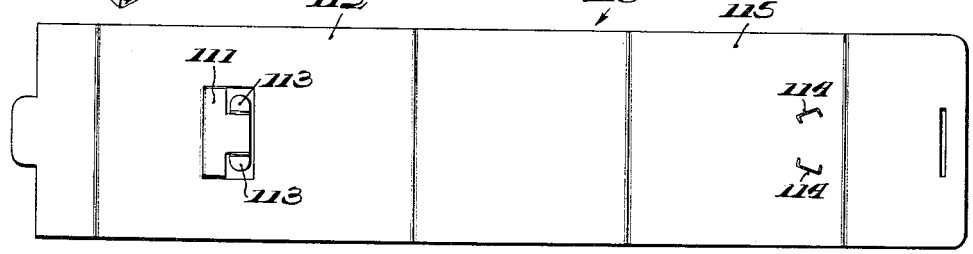
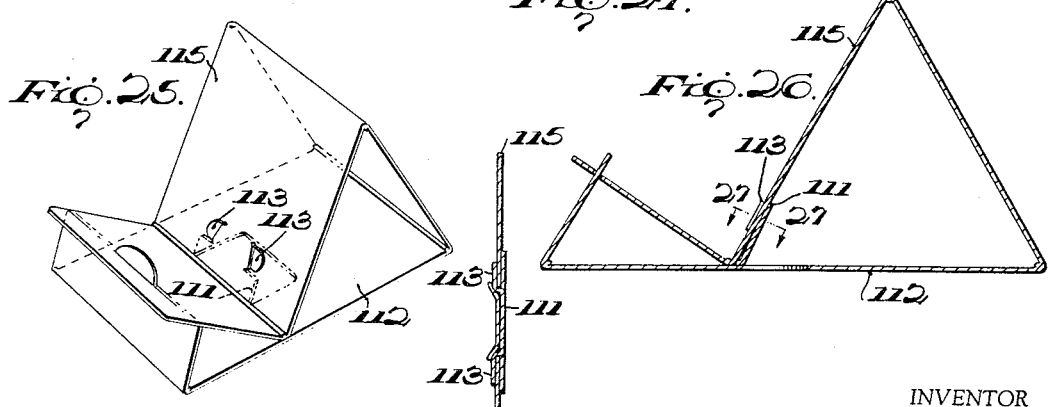
INVENTOR
Robert Stuart Hummel.
BY Albert H. Kirchner
ATTORNEY Dec. 13, 1955  R. S. HUMMEL  2,726,835
COLLAPSIBLE DISPLAY STANDS
Filed Feb. 6, 1951  7 Sheets-Sheet 5
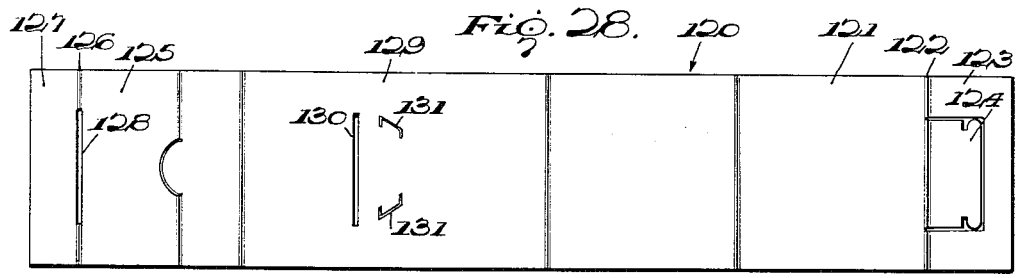
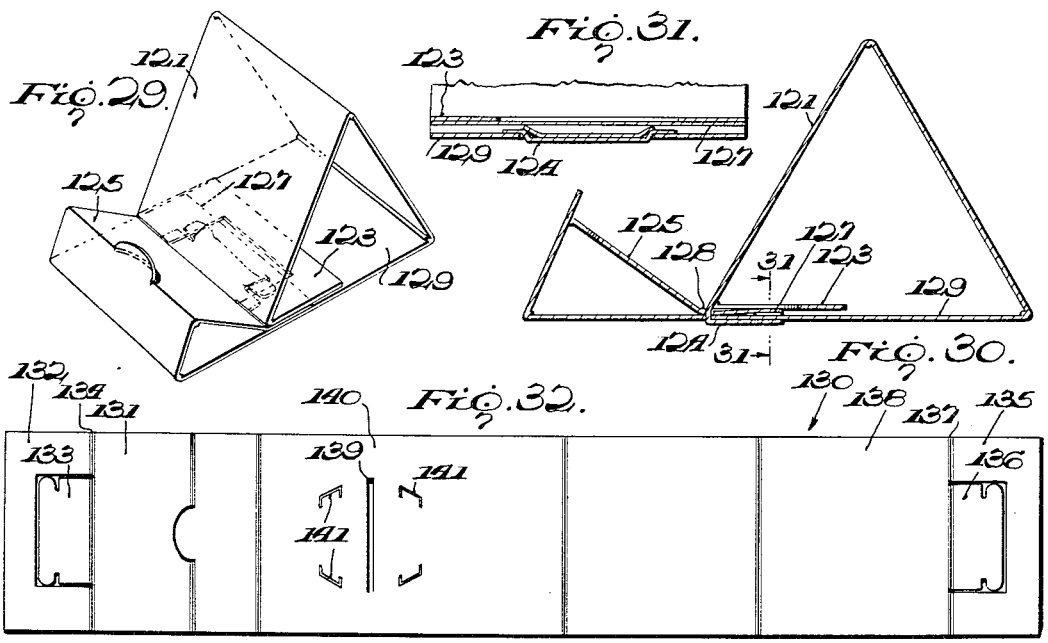
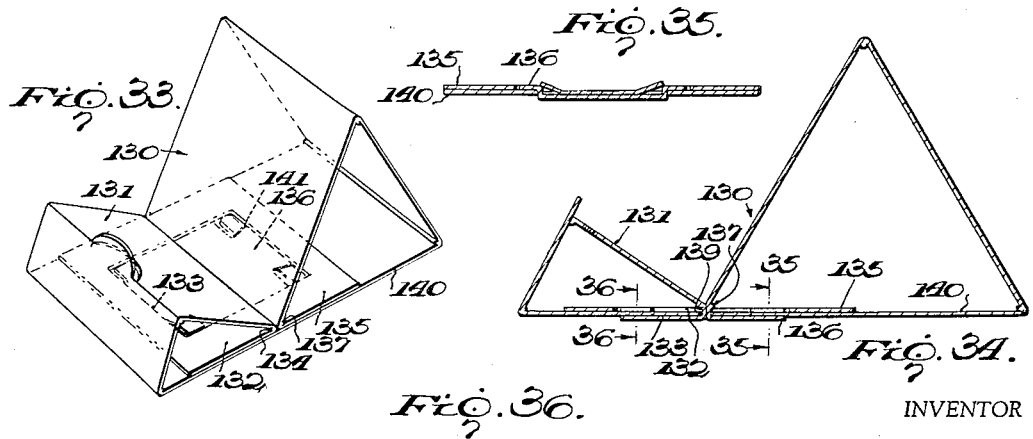
INVENTOR
Robert Stuart Hummel.
BY Albert H. Kirchner
ATTORNEY

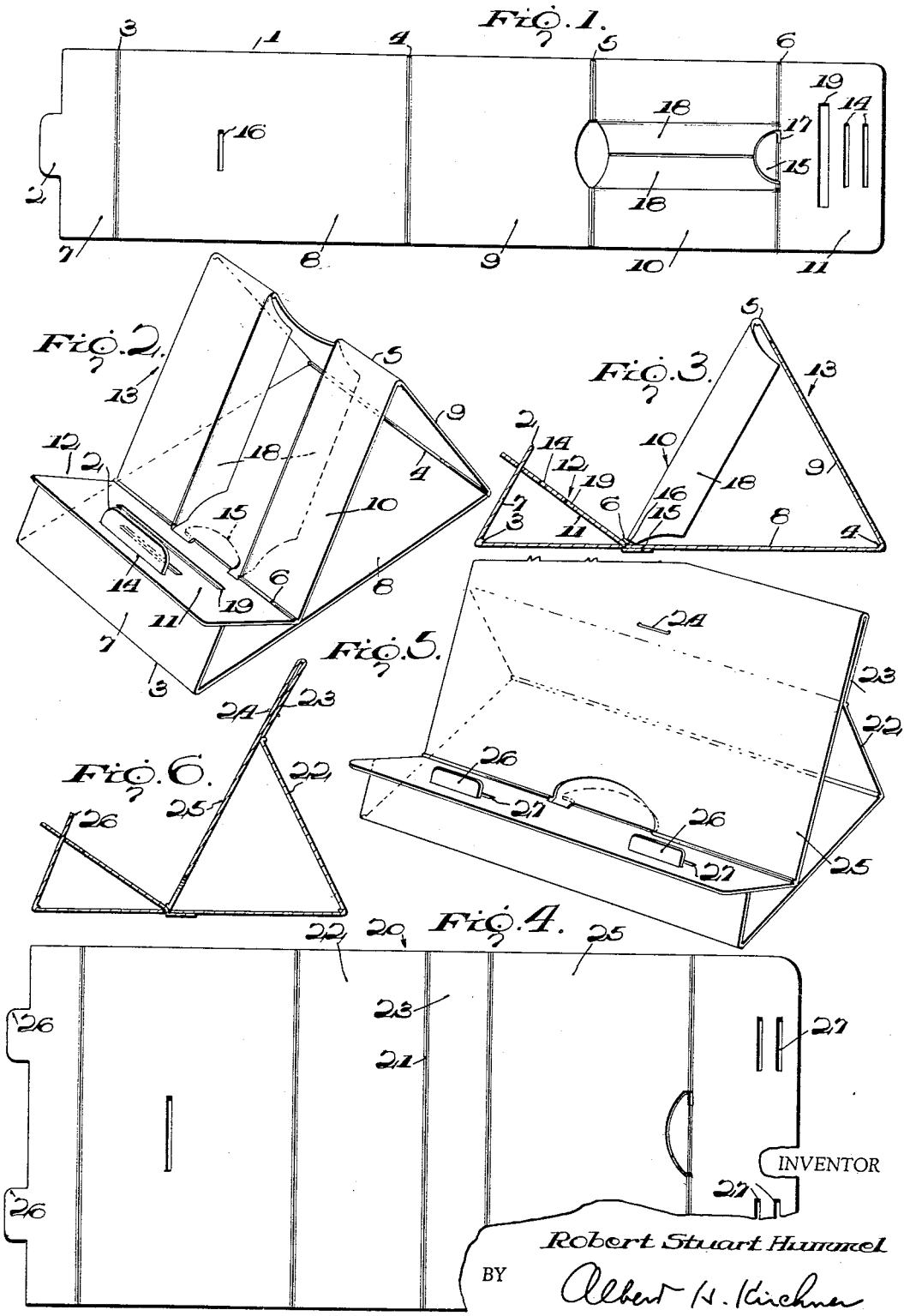

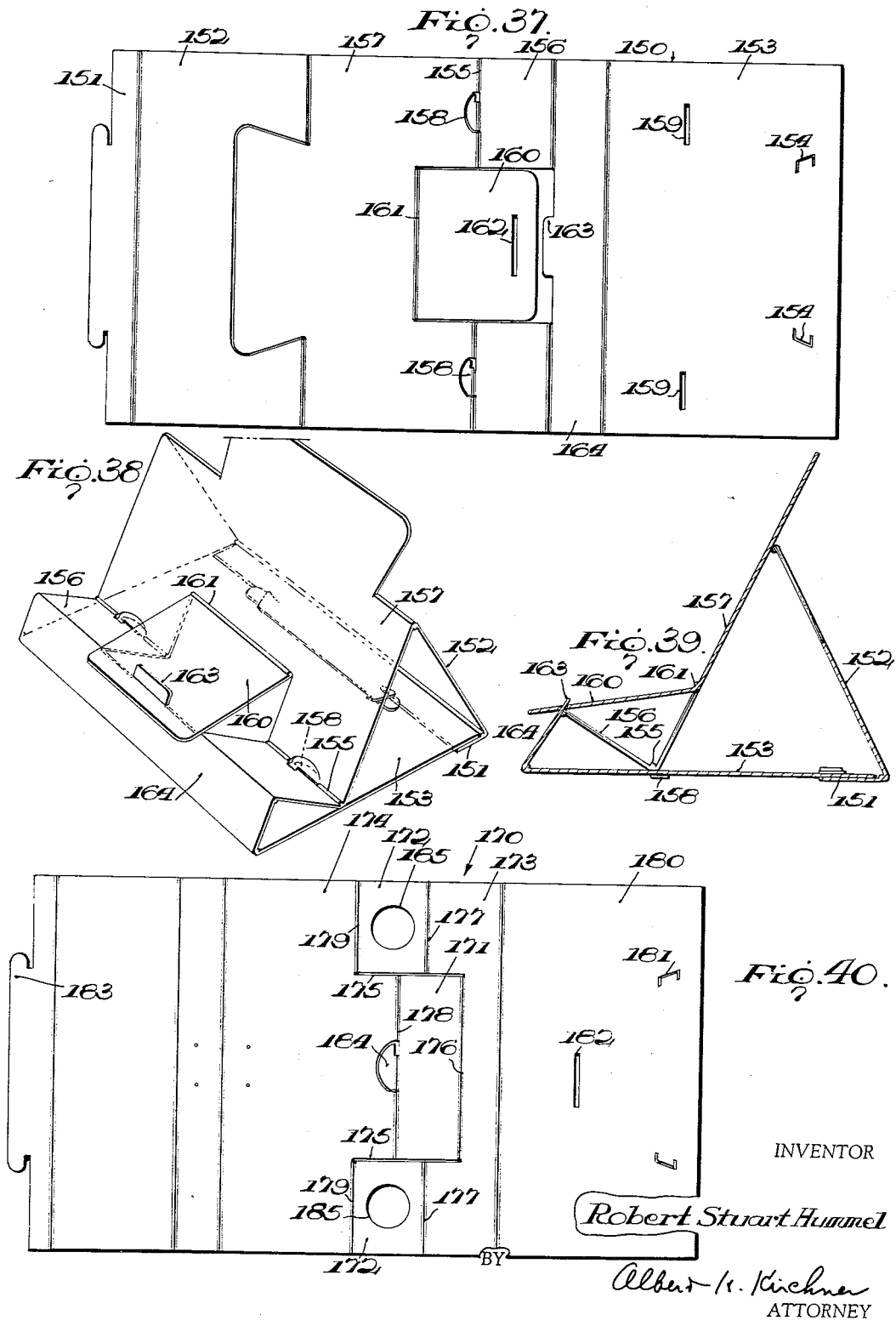

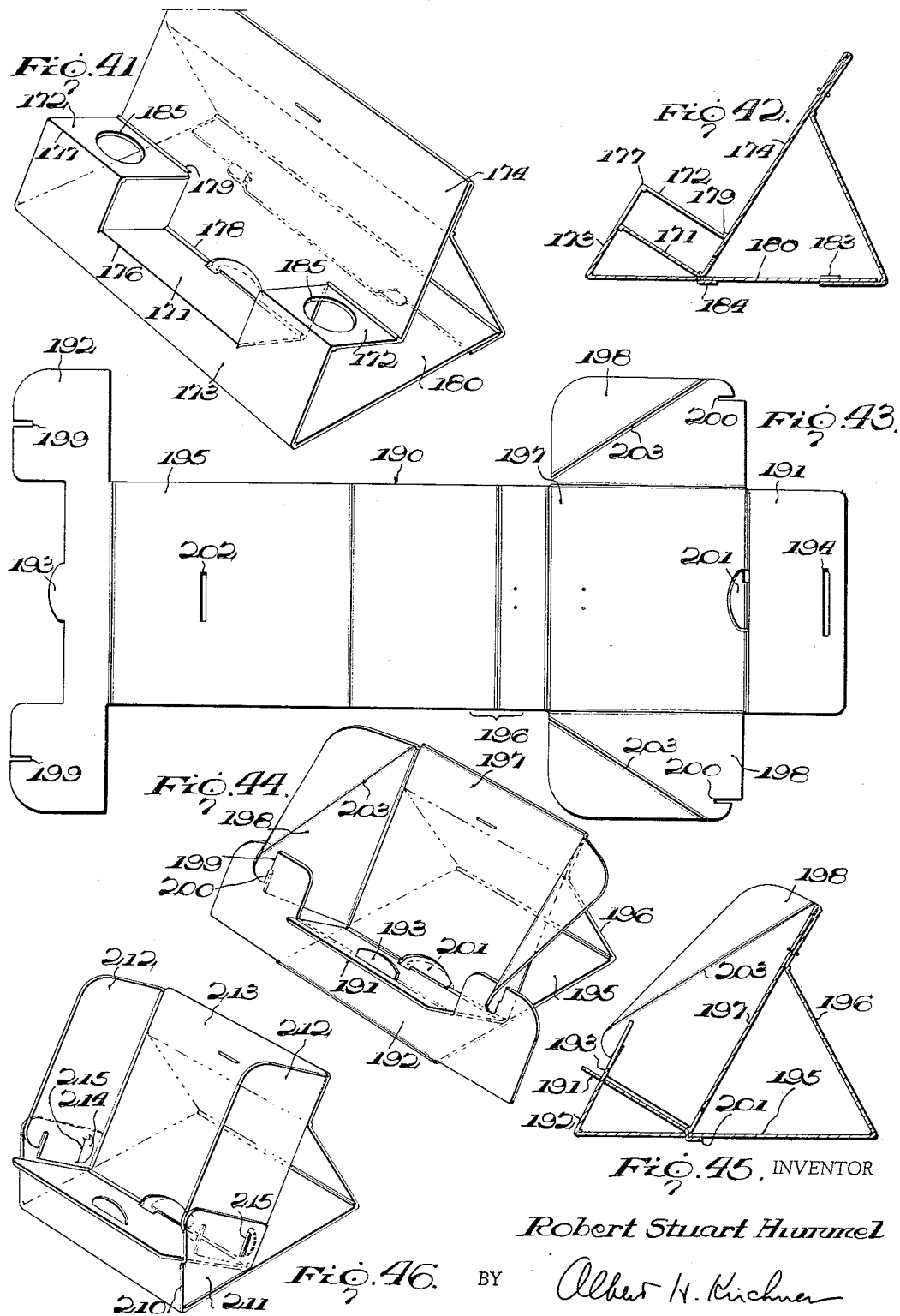

United States Patent Office 2,726,835
Patented Dec. 13, 1955

2,726,835

COLLAPSIBLE DISPLAY STANDS

Robert Stuart Hummel, Takoma Park, Md.

Application February 6, 1951, Serial No. 209,554

12 Claims. (Cl. 248—198)

The present invention relates to collapsible display stands for supporting and exhibiting articles of merchandise and the like.

A principal object of the invention is to produce an inexpensive stand of the character indicated which may be made of a single sheet of relatively stiff but thin material such as suitable cardboard stock blanked out by dies or otherwise, which is well adapted to be supplied in flat form by manufacturers and distributors and to be set up in operative position by retailers for the purpose of displaying merchandise on store counters, shelves, show cases, etc.

Important features of the invention, in certain preferred forms of embodiment which are depicted in the accompanying drawings and which will be explained more in detail hereinafter, include scoring a single sheet to make the device unfoldable from its flat, collapsed shipping condition to an operative condition including a three-dimensional back structure and a three-dimensional shelf structure, each comprising a plurality of panels, including one panel common to the shelf and back structures and serving as a single base element supporting the two structures and uniting them so that the set-up device is adequately rigid and stable for holding an article to be displayed with the bottom of the article resting on the shelf structure and with the back of the article leaning against the back structure.

Another important feature consists in providing portions, such as tabs and slots, of the blank which will readily interfit or interlock in a simple and easily effected manner that will be self-evident to an inexperienced person and will securely hold the parts in set-up relation.

While the display stand provided by the invention is of general application, capable of being made in a wide range of sizes and of being used to mount any of a great number of different kinds of articles, it will be helpful to an understanding of the invention to explain that the device is particularly useful in making merchandising displays of such articles as books, cosmetics, dentifrices, safety razor sets, phonograph records and many other types of wares in retail stores, with or without appropriate design and text material printed on the exposed parts of the stand to advertise the object and/or enhance the attractiveness of the presentation.

With the foregoing and other objects and advantages contemplated and intended, the invention comprises the essential features of construction pointed out in the appended claims. For the purpose of illustrating the invention there are shown in the accompanying drawings and there will be described in the present specification certain embodiments which are now preferred because they have been fully tested and found in actual practice to give satisfactory and reliable results. In this connection it is to be understood that the several parts and elements comprising these embodiments may be variously arranged and organized, within the scope of the claims, and that the spirit of the invention is not limited to the precise details of the illustrated embodiments.

In the drawings,

Figure 1 is a plan view of a blank comprising one form of the invention;

Fig. 2 is a perspective view of the Fig. 1 embodiment in set-up position;

Fig. 3 is a central vertical longitudinal sectional view of the same device;

Fig. 4 is a plan view of a blank comprising a second form of the invention;

Fig. 5 is a perspective view of the Fig. 4 embodiment in set-up position;

Fig. 6 is a central vertical longitudinal sectional view of the same device;

Fig. 7 is a plan view of a blank comprising a third form of the invention;

Fig. 8 is a perspective view of the Fig. 7 embodiment in set-up position;

Fig. 9 is a central vertical longitudinal sectional view of the same device;

Fig. 10 is a plan view of a blank comprising a fourth form of the invention;

Fig. 11 is a perspective view of the Fig. 10 embodiment in set-up position;

Fig. 12 is a central vertical longitudinal sectional view of the same device;

Fig. 13 is a plan view of a blank comprising a fifth form of the invention;

Fig. 14 is a perspective view of the Fig. 13 embodiment in set-up position.

Fig. 15 is a central vertical longitudinal sectional view of the same device;

Fig. 16 is a detail sectional view taken on the line 16—16 of Fig. 15;

Fig. 17 is a plan view of a blank comprising a sixth form of the invention;

Fig. 18 is a perspective view of the Fig. 17 embodiment in set-up position;

Fig. 19 is a central vertical longitudinal sectional view of the same device;

Fig. 20 is a plan view of a blank comprising a seventh form of the invention;

Fig. 21 is a perspective view of the Fig. 20 embodiment in set-up position;

Fig. 22 is a central vertical longitudinal sectional view of the same device;

Fig. 23 is a detail sectional view taken on the line 23—23 of Fig. 22;

Fig. 24 is a plan view of a blank comprising an eighth form of the invention;

Fig. 25 is a perspective view of the Fig. 24 embodiment in set-up position;

Fig. 26 is a central vertical longitudinal sectional view of the same device;

Fig. 27 is a detail sectional view taken on the line 27—27 of Fig. 26;

Fig. 28 is a plan view of a blank comprising a ninth form of the invention;

Fig. 29 is a perspective view of the Fig. 28 embodiment in set-up position;

Fig. 30 is a central vertical longitudinal sectional view of the same device;

Fig. 31 is a detail sectional view taken on the line 31—31 of Fig. 30;

Fig. 32 is a plan view of a blank comprising a tenth form of the invention;

Fig. 33 is a perspective view of the Fig. 32 embodiment in set-up position;

Fig. 34 is a central vertical longitudinal sectional view of the same device;

Fig. 35 is a detail sectional view taken on the line 35—35 of Fig. 34;

Fig. 36 is a detail sectional view taken on the line 36—36 of Fig. 34;

Fig. 37 is a plan view of the blank comprising an eleventh form of the invention;

Fig. 38 is a perspective view of the Fig. 37 embodiment in set-up position;

Fig. 39 is a central vertical longitudinal sectional view of the same device;

Fig. 40 is a plan view of a blank comprising a twelfth form of the invention;

Fig. 41 is a perspective view of the Fig. 40 embodiment in set-up position;

Fig. 42 is a central vertical longitudinal sectional view of the same device;

Fig. 43 is a plan view of a blank comprising a thirteenth form of the invention;

Fig. 44 is a perspective view of the Fig. 43 embodiment in set-up position;

Fig. 45 is a central vertical longitudinal sectional view of the same device; and Fig. 46 is a perspective view of a fourteenth form of the invention in set-up position.

In the form of the invention shown in Figs. 1–3 a blank 1 of substantially oblong shape is provided with a tab 2 extending from the approximately central portion of one end edge and the blank is transversely scored or otherwise weakened along the lines 3, 4, 5 and 6 to provide the five panels designated 7, 8, 9, 10 and 11. When the blank is folded along the lines 3—6 into the set-up position shown in Figs. 2 and 3 to provide a front shelf structure 12 and a back structure 13, the several panels function as a base panel 8 common to the shelf and back structures, a shelf structure floor panel 11, supported by its prop panel 7, and a back structure front panel 10 supported by its rear or prop panel 9.

In order to maintain the several panels securely in set-up position, the blank is cut to provide in the shelf floor panel 11 a slot or a plurality of slots 14 for receiving the tab 2, and is further cut from the fold line 6 into the central portion of the channel 10 to provide a tab 15 for insertion into a slot 16 cut in the base panel 8 along an imaginary transverse line which divides those portions of the base panel which underlie the shelf and back structure respectively. To make the connection of the tab 15 in the slot 16 proof against accidental separation, the tab may be undercut slightly from one end of its base line, as shown at 17, so that the undercut can be interlocked with an end margin of the slot 16 by a lateral sliding movement after insertion into the slot to assume the position shown in Fig. 2.

In order to adapt the device of Fig. 2 to display an article of more or less cylindrical shape, such as a bottle or jar, or any other object of considerable thickness, the front panel 10 of the back structure 13 may be longitudinally slitted and scored to provide wings 18 arcuately cut out at their ends so as to be foldable rearwardly at right or obtuse angles into the back structure to provide an opening into which the back of the article may project, and floor panel 11 of the shelf structure 12 may be provided with a relatively wide transverse slot 19 so that the bottom of the article may by its weight sufficiently depress the rear portion of the floor panel and be caught behind the front edge of the slot 19.

With the several panels folded and their tabs inserted into the slots provided for them, as shown in Figs. 2 and 3, by a simple operation which is very readily and quickly performed, the blank is transformed into a stable stand for supporting an article in display position. If, as is preferred, a plurality of slots 14 are provided, the angle of inclination of the shelf structure floor panel can be adjusted and the projecting portion of the tab 2 can, if desired, be seated against the front of the article to assist in steadying it in supported position.

It will be recognized that the formation of the tab 15 cooperates with the necessary cut-out in the adjacent ends of the wings 18, the material forming the tab being taken from the material forming the wings, as is best shown in Fig. 1. If for any reason, such as the shape of the article to be supported, it is found unnecessary to provide wings 18, the panel 10 is not longitudinally cut, and the space from which the tab 15 is cut is simply left open, in the form of a semi-circular hole at the bottom of the panel 10.

In the second form of the invention, shown in Figs. 4–6, a slightly modified type of blank 20 is used, as shown in Fig. 4. This blank differs from the blank 1 principally in having its back structure prop panel divided by a transverse fold line 21 into two parts 22 and 23 so that the part 23, which is somewhat shorter than the part 22 in its dimension lengthwise of the blank, can be fastened, as by a wire staple 24, flat against the upper portion of the front panel 25 of the back structure. This arrangement somewhat lowers the angle at which the panel 25 inclines and it substantially stiffens the support which this panel is given by the portion 22 of the prop panel.

The blank 20 may be otherwise fashioned in much the same way as the blank 1. However, if, as shown in the drawing, the blank 20 is made appreciably wider than the blank 1, as for supporting a wider article, such as an open book, it may be found desirable to provide two tabs 26 for insertion into two laterally aligned slots 27, as shown in Figs. 4 and 5.

In the third form of the invention, shown in Figs. 7–9, the blank 30 differs from the previously described blanks in the formation of the tab 31 projecting from the free end edge of the shelf structure floor panel 32 and in the shape of the slot 33 formed in the shelf structure prop panel 34 into which this tab is inserted. As shown in Figs. 7–8, the tab is undercut at its ends, and the slot is elongated along its forward edge and reduced in length along its rear edge. This provides a secure interlock when the tab is inserted through the longer portion of the slot and then pushed back to interfit the undercuts into the end margins of the narrower part of the slot, to provide the assembly shown in Fig. 8.

In the fourth form of the invention, shown in Figs. 10–12, the blank 40 is like the blank 20 of Fig. 4 in having its back structure prop panel 41 divided by a fold line 42 into portions 43 and 44 adaped to be related to the back structure front panel 45 by a staple 46 in the same way as the arrangement shown in Figs. 4–6. The blank differs however by having a panel 47 projecting from the front end of the shelf structure prop panel 48 for folding under the base panel 49 so that the tab 50, which extends from the free end of the panel 47, can be inserted through and interlocked with the end of a transverse slot 51 which is cut into the base panel. A similar slot 52, cut further back in the base panel 49, receives in interlocking engagement a tab 53 which is cut out of the back structure front panel 45 and has its base in the line of fold 54 which divides the panel 45 from the shelf structure floor panel 55. If desired, a tab 56 may be cut from the floor panel 55 and have its imaginary base line in the line of fold 57 which divides the floor panel from the prop panel 48, so that the tab 56 will stand up unfolded and form a guard or stop for retaining behind it the article to be supported.

In the fifth form of the invention, shown in Figs. 13–16, the blank 60 has a short panel 61 formed on the free end of the back structure rear panel 62 and provided with a tab 63 having its end portions undercut so that the panel 61 can be folded under the end of the base panel 64 with the ends of the tabs 63 inserted into slits 65 cut into the end zone of the base panel 64. A tab 66, having its base aligned in the fold line 67 dividing the shelf structure floor panel 68 from the front panel 69 of the back structure, is cut from the back structure and insertible into a slot 70 cut in the base structure 64 for holding the panels in the set-up position shown in Figs. 14 and 15. The floor panel 68 may have a tab 71 cut out from its forward edge so as to project upwardly from the prop panel 72, as shown in Figs. 14 and 15, and the floor panel may if desired have an additional tab 73 formed in it for upward bending in case a relatively shallow or thin article is to be seated behind it.

In the sixth form of the device, shown in Figs. 17–19, a blank 80 is used, in which a short panel 81, terminating in a tab 82, is formed on the forward end of the panel 83 which constitutes the front panel of the back structure, so that this short panel 81 can be folded over the upper edge of the rear panel 84 of the back structure and have the tab 82 inserted in a slot 85 cut into the panel 84. The fold line 86 which divides the back structure front panel 83 from the shelf structure floor panel 87 has a tab 88 cut from the back structure front panel 83 for insertion into a slot 89 in the base panel 90. The set-up arrangement of the several panels is shown in Figs. 18 and 19.

In the seventh form of the invention, shown in Figs. 20–23, a blank 100 has a short panel 101 projecting from the free end of the shelf structure floor panel 102 and formed with an end tab 103 having undercut lateral terminals which are insertible in slits 104 formed in the lower end zone of the back structure front panel 105. The panel 105 has projecting from it a short panel 106 which, in the set-up position of the device, lies flat on the base panel 107, and is held in position by a tab 108 cut from the back structure front panel 105, based on the line of fold which divides the panel 105 from the panel 106, and interlocked in a slot 109 cut in the base panel 107.

In the eighth form of the invention, shown in Figs. 24–27, the blank 110 has a tab 111 cut from the base panel 112 and turned up so that short wings 113 formed on the ends of the tab can be inserted through slits 114 cut into the lower end zone of the back structure of front panel 115.

In the ninth form of the invention, shown in Figs. 28–31, the blank 120 is used. In this blank the front panel 121 of the back structure is extended past a fold line 122 to provide a short panel 123 which is cut out to provide an end winged tab 124 based on the fold line 122. At the other end of the blank the shelf structure floor panel 125 is continued past a fold line 126 to provide a short terminal panel 127, and the fold line 126 is slotted throughout its intermediate portion, as shown at 128.

The base panel 129 is transversely slotted at 130 and behind this slot is provided with a pair of slits 131. The blank is folded to bring slot 128 over slot 130 and the tab 124 is inserted through both of these slots, after which the tab is turned up flat against the underside of the base 129 and its wings are inserted through the slits 131 to be held beneath the panels 123 and 127.

In the tenth form of the invention, shown in Figs. 32–36, the blank 130 is used. In this blank the floor panel 131 of the shelf structure is extended to provide a short end panel 132 having a winged tab 133 cut out from it and based on the fold line 134 which divides the two panels. The structure is the same as is shown at the right hand end of the blank 120 in Fig. 28, and is duplicated at the other end of the blank to form the short end panel 135 with its tab 136 extending from the fold line 137 at the free end of the back structure front panel 138. A pair of slits 141 are formed in the base panel 140 on each side of a transverse slot 139.

The device is set up by inserting the tab 136 through the slot 139, with the tab 135 lying flat against the top surface of the base panel 140 in front of the slot and by folding the tab 136 up against the bottom surface of the base panel and inserting the winged ends of the tab up through the rear slits 141. The tab 133 is then pushed through the slot 139, with the panel 132 lying flat on top of the panel 135, and the tab 133 is then turned forwardly and its winged ends fitted up through the front pair of slits 141 to fasten the tab 133 flat against the underside of the base panel 140 in front of the slot 139.

In the eleventh form of the invention, shown in Figs. 37–39, the blank 150 is used. In this blank a short tabbed panel 151 projects from the end of the back structure rear panel 152 for folding under the back end of the base panel 153 and insertion of the winged ends of the tab into slits 154 formed in the base panel. The fold line 155, which divides the shelf structure floor panel 156 from the back structure front panel 157, has a pair of tabs 158 projecting from it, being cut out from the material of the panel 157, and these tabs are insertible through slots 159 cut into the base panel 153. A supplemental floor panel 160 is cut from the contiguous portions of the panels 156 and 157 and is hinged along the fold line 161 at its base in the panel 157 and slotted at its front end zone, as shown at 162, for reception of a tab 163, which projects up from the front edge of the shelf structure prop panel 164. This embodiment of the invention is specially adapted to be used in the displaying of so-called "combination offers" in retail stores in which different and separate but related items are sold together at a reduced aggregate price. Thus, for example, a safety razor set may be mounted on the supplemental floor panel 160, and tubes of shaving cream displayed on the two side portions of the floor panel 156, or jars of cosmetic cream and cakes of soap may be arranged attractively on the three panels 160 and 156.

In the twelfth form of the invention, shown in Figs. 40–42, the blank 170 is used. This blank differs from the blank 150 principally in providing a shelf structure having a depressed or lower level central floor panel 171 and two end floor panels 172 which are elevated. This is accomplished by cutting the contiguous portions of the shelf structure prop panel 173 and the back structure front panel 174 lengthwise along the lines 175 and then folding along the transversely offset lines 176 and 177 to make the prop panel 173 higher at its ends and lower in its middle, and by folding also along the transversely offset lines 178 and 179 to form the rear edges of the central floor panel and the end floor panels, respectively. The base panel 180 is slitted at 181 and slotted at 182 to receive tabs 183 and 184, respectively, in the same way as blank 150. Openings 185 may if desired be provided in any peripheral shape in the end floor panels 172 for snugly receiving articles of merchandise to be mounted therein when the blank is set up as shown in Figs. 41 and 42. It will be recognized from these figures that this form of the device is somewhat similar to that of Figs. 37–39 in the specific uses to which it is well adapted to be put.

In the thirteenth form of the invention, shown in Figs. 43–45, the blank 190 is used. The terminal portions of the blank are respectively a shelf structure floor panel 191 and a prop panel 192 therefor. The latter is made appreciably wider than the former and is centrally cut back or out to receive the floor panel, the connection being made by inserting a prop panel tab 193 into a slot 194 in the floor panel. The base panel 195 and the back structure rear panel 196 are both made as narrow as the floor panel 191, and the back structure front panel 197 is made as wide as the shelf structure prop panel 192. The excess width of the panel 197 is folded forward, in the set-up device, to provide side wings 198 which are secured to the sides of the shelf structure prop panel 192 by interfitting the edge slots 199 and 200 formed in the panel and wings respectively. A tab 201 fitting into a slot 202 holds the vertex of the shelf and back structure panels securely down on the base panel in the same way as in other forms of the invention heretofore described. If desired, the outer sides of the wings 198 may be folded laterally as along the lines 203.

The fourteenth form of the device, shown in set-up position in Fig. 46, differs from the thirteenth form simply in having the excess width at each side of the shelf structure prop panel folded back right angularly, along lines 210, to provide wings 211 which engage the wings 212, folded forward from the excess width of the back structure front panel 213, by means of interfitted tabs and slots 214 and 215. This results in a secure and stable relationship of shelf and back structure providing a floor panel trimmed by a pair of side wings, presenting like the Fig. 44 embodiment, much the appearance of a miniature stage.

It is to be understood that the generic principles of the invention, as defined by the broader of the appended claims, may be incorporated in embodiments additional to those selected for illustration in this application and that all such embodiments, to the extent that they employ the principles of the invention, are to be deemed within the scope and purview of the claims.

In this connection, a typical deviation from the details of the several disclosed embodiments which may be made without departing from the spirit of the invention will be evident from a comparison of Figs. 7 and 9 with the other figures. In most forms of the device the tab, typified by the tab 15 in Figs. 1 and 3, or 53 in Figs. 10 and 12, by which the shelf structure and back structure are held properly related in the set up condition of the blank, projects from the floor panel of the shelf structure. However, in Figs. 7 and 9 it will be noted that this tab projects from the front panel of the back structure. I wish it to be understood that this tab detail is interchangeable, so that in all the constructions which are disclosed with the tab formed as in Figs. 3 and 12, the tab can just as well be formed as in Fig. 9.

Other modifications will readily suggest themselves to those skilled in the art.

I claim:

1. A collapsible display stand for supporting and exhibiting an article of merchandise or the like comprising a single sheet of relatively stiff material weakened along a plurality of transverse parallel lines to provide a plurality of panels connected in hinged relation at their contiguous edges to provide a plural-panel shelf structure and a plural-panel back structure, one of the panels being common to the shelf and back structures and forming the base portion of the stand, one of the panels of the shelf structure comprising a floor panel for supporting the bottom of the article and one of the panels of the back structure comprising a support against which the article rests in leaning engagement, said two last named panels converging to provide an article-engaging cradle portion, and means removably connecting said cradle portion to said base portion comprising a tab struck out from the cradle portion and a slot formed in the base portion, said tab being inserted into said slot and having a laterally extending notch abutting material of said slotted portion so as to prevent relative longitudinal movement of said portions.

2. A collapsible display stand as claimed in claim 1, in which said tab is creased and folded at its base and said notch is in the line in which said tab is creased and folded.

3. A collapsible display stand as claimed in claim 1, in which said panels forming the cradle are separable and tabs extend from each of them through a slot formed in the base portion.

4. A collapsible display stand as claimed in claim 1, in which said tab extends from the rear edge portion of the shelf structure floor panel.

5. A collapsible display stand as claimed in claim 1, in which said tab extends from the front panel of the back structure.

6. A collapsible display stand as claimed in claim 1, in which the two panels forming said cradle portion are separable at their converging edges.

7. A collapsible display stand as claimed in claim 1, in which the cradle portion is segmented to provide a plurality of panel elements at different levels adapted to support articles of merchandise on different levels.

8. A collapsible display stand as claimed in claim 1, in which the shelf structure includes a prop panel separably connected to the floor panel by a portion of the floor panel interfitted through an opening in the prop panel.

9. A collapsible display stand as claimed in claim 1, in which the floor panel of the shelf structure and the article supporting panel of the back structure are separable at their converging edges and the means by which said two panels are interfitted with the base panel comprises a locking extension of the edge of one of said two panels of the cradle portion interfitting with slots formed in the other panel of the cradle portion and said base.

10. A collapsible display stand as claimed in claim 1, in which the floor panel of the shelf structure is provided with a recess to receive a portion of the article being supported.

11. A collapsible display stand as claimed in claim 1, in which the shelf structure includes a prop panel separably connected to the floor panel by a portion of the floor panel interfitted through an opening in the prop panel, the upper margin of the prop panel extending above the plane of the floor panel to provide a guard preventing undesired movement of the article being supported.

12. A collapsible display stand as claimed in claim 1, in which the shelf structure is provided with a portion which projects above the level of the floor panel, said projecting portion being cut from the floor panel.

References Cited in the file of this patent

UNITED STATES PATENTS

| | | |
|---|---|---|
| 1,192,957 | Townsend | Aug. 1, 1916 |
| 1,470,159 | Gibson | Oct. 9, 1923 |
| 1,602,348 | Everson | Oct. 5, 1926 |
| 1,684,124 | Burgess | Sept. 11, 1928 |
| 1,881,707 | Larkin | Oct. 11, 1932 |
| 1,936,340 | Steudel | Nov. 21, 1933 |
| 2,035,021 | Pyle | Mar. 24, 1936 |
| 2,224,530 | Weinstein | Dec. 10, 1940 |
| 2,490,356 | Hummel | Dec. 6, 1949 |